(12) United States Patent  
Heap et al.

(10) Patent No.: US 8,813,885 B2
(45) Date of Patent: Aug. 26, 2014

(54) METHOD AND APPARATUS FOR CONTROLLING A MULTI-MODE POWERTRAIN SYSTEM

(75) Inventors: Anthony H. Heap, Ann Arbor, MI (US); Kee Yong Kim, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 6 days.

(21) Appl. No.: 13/568,086

(22) Filed: Aug. 6, 2012

(65) Prior Publication Data

US 2014/0039739 A1 Feb. 6, 2014

(51) Int. Cl.
*B60W 10/00* (2006.01)
*B60W 20/00* (2006.01)

(52) U.S. Cl.
USPC ............. 180/65.265; 701/22; 701/51; 701/87

(58) Field of Classification Search
CPC ..... B60W 20/00; B60W 10/06; B60W 10/08; B60W 10/00; B60W 30/00
USPC .............. 701/102, 54, 22, 51, 87; 180/65.265
See application file for complete search history.

(56) References Cited

U.S. PATENT DOCUMENTS

| | | | |
|---|---|---|---|
| 6,847,189 B2* | 1/2005 | Frank | 320/104 |
| 7,645,206 B2 | 1/2010 | Holmes et al. | |
| 8,010,247 B2* | 8/2011 | Heap et al. | 701/22 |
| 2003/0204302 A1* | 10/2003 | Amano | 701/102 |
| 2005/0049772 A1* | 3/2005 | Liu | 701/54 |
| 2005/0080538 A1* | 4/2005 | Hubbard et al. | 701/54 |
| 2008/0091332 A1* | 4/2008 | Yasui et al. | 701/102 |
| 2008/0188348 A1* | 8/2008 | Kumazaki et al. | 477/35 |
| 2008/0220934 A1* | 9/2008 | Babcock et al. | 477/5 |
| 2008/0243358 A1* | 10/2008 | Kojima et al. | 701/102 |
| 2008/0287255 A1* | 11/2008 | Snyder | 477/110 |
| 2008/0288156 A1* | 11/2008 | Honda et al. | 701/102 |
| 2009/0115352 A1* | 5/2009 | Heap et al. | 318/8 |
| 2009/0118884 A1* | 5/2009 | Heap | 701/22 |
| 2009/0118963 A1 | 5/2009 | Heap | |
| 2010/0095931 A1* | 4/2010 | Oishi et al. | 123/336 |
| 2010/0179009 A1 | 7/2010 | Wittkopp et al. | |
| 2010/0227735 A1* | 9/2010 | Sah et al. | 477/5 |
| 2011/0100326 A1* | 5/2011 | Yoshida et al. | 123/337 |
| 2011/0167811 A1* | 7/2011 | Kawaguchi et al. | 60/395 |
| 2011/0208394 A1* | 8/2011 | Kuwahara et al. | 701/54 |
| 2011/0232980 A1* | 9/2011 | Nomura et al. | 180/65.265 |
| 2012/0035818 A1* | 2/2012 | Takanami et al. | 701/54 |

OTHER PUBLICATIONS

U.S. Appl. No. 13/570,175, Lado, et al, unpubl.

(Continued)

*Primary Examiner* — Calvin Cheung
*Assistant Examiner* — Luis A Martinez Borrero

(57) ABSTRACT

A method for operating a powertrain system to transfer torque among an engine, torque machines, and a driveline includes identifying a speed/torque search window responsive to a parameter affecting engine power output and the output torque request. A search is executed to determine a preferred engine operating point for operating the powertrain system in response to an output torque request. The search includes determining a candidate power cost associated with operating the powertrain system at the candidate engine torque and candidate engine speed for each of a plurality of candidate engine speeds and candidate engine torques within the speed/torque search window. A preferred engine operating point is determined as the candidate engine speed and the candidate engine torque associated with a minimum of the candidate power costs. Engine operation is controlled responsive to the preferred engine speed.

14 Claims, 4 Drawing Sheets

(56) References Cited

OTHER PUBLICATIONS

U.S. Appl. No. 13/569,929, Diaz, et al, unpubl.
U.S. Appl. No. 13/568,086, Heap, et al., unpubl.
U.S. Appl. No. 13/568,070, Heap, et al, unpubl.
U.S. Appl. No. 13/571,070, Heap, et al, unpubl.
U.S. Appl. No. 13/568,071, Kim, et al, unpubl.
U.S. Appl. No. 13/568,083, Heap, et al., unpubl.

* cited by examiner

METHOD AND APPARATUS FOR CONTROLLING A MULTI-MODE POWERTRAIN SYSTEM

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

Maximum engine power can be derated due to external factors and engine and powertrain operating factors. One known external factor that derates engine power is operating the engine and powertrain system at high elevations. One known engine and powertrain operating factor that derates engine power is operating the engine using fuel that has a lower octane level than the engine was designed for, thus leading to spark retard to reduce engine pre-ignition.

SUMMARY

A method for operating a powertrain system to transfer torque among an engine, torque machines, and a driveline includes identifying a speed/torque search window responsive to a parameter affecting engine power output and the output torque request. A search is executed to determine a preferred engine operating point for operating the powertrain system in response to an output torque request. The search includes determining a candidate power cost associated with operating the powertrain system at the candidate engine torque and candidate engine speed for each of a plurality of candidate engine speeds and candidate engine torques within the speed/torque search window. A preferred engine operating point is determined as the candidate engine speed and the candidate engine torque associated with a minimum of the candidate power costs. Engine operation is controlled responsive to the preferred engine speed.

BRIEF DESCRIPTION OF THE DRAWINGS

One or more embodiments will now be described, by way of example, with reference to the accompanying drawings, in which.

DETAILED DESCRIPTION

Figure 1:
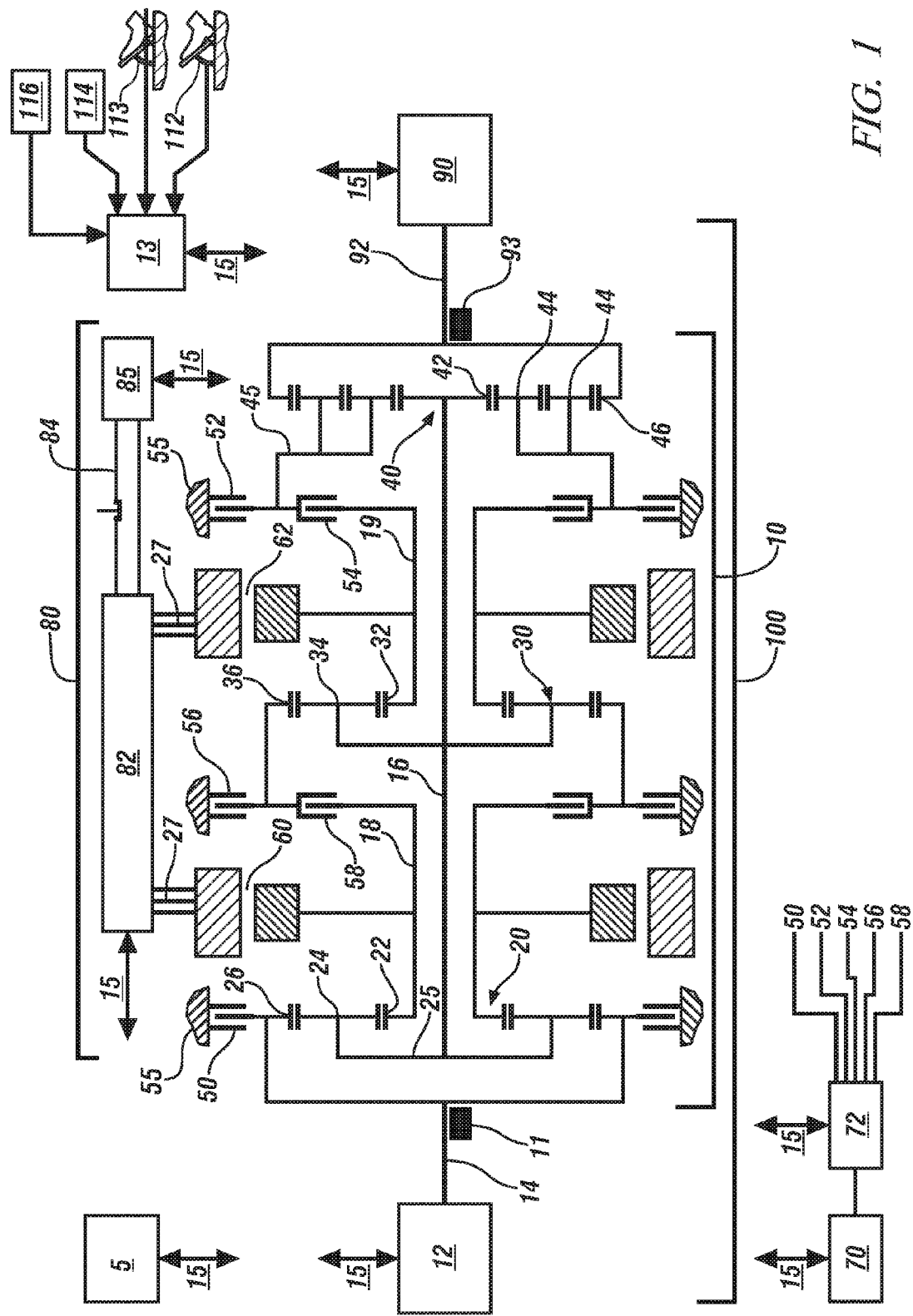
FIG. 1 illustrates a multi-mode powertrain system including an internal combustion engine, transmission, driveline, and a controller, in accordance with the disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62, respectively, and is configured to transfer torque between the engine 12, the torque machines 60, 62, and the driveline 90. As illustrated, the first and second torque machines 60, 62 are electric motor/generators.

The high-voltage electrical system 80 includes an electrical energy storage device, e.g., a high-voltage battery (battery) 85 electrically coupled to a transmission power inverter control module (TPIM) 82 via a high-voltage electrical bus 84, and is configured with suitable devices for monitoring electric power flow including devices and systems for monitoring electric current and voltage. The battery 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14.

Power output from the engine 12, i.e., engine speed and engine torque, can differ from input speed and input torque to the transmission 10 due to placement of torque-consuming components on the input member 14 between the engine 12 and the transmission 10, e.g., a torque management device or a mechanically-powered hydraulic pump. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the electrical energy storage device (battery) 85. The battery 85 is high voltage DC-coupled to the TPIM 82 via the high-voltage electrical bus 84 that preferably include a contactor switch that permits or prohibits flow of electric current between the battery 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the battery 85 to AC power for powering respective ones of the first and second torque machines 60 and 62, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the battery 85 to charge and discharge the battery 85.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of battery 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system, include commanding an output torque request and selecting a transmission range. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The operator-selectable positions of the transmission range selector 114 can correspond directly to individual transmission ranges set forth in Table 1, or may correspond to subsets of the transmission ranges set forth in Table 1. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of transmission ranges and engine states to generate and transfer torque to the driveline 90. The engine states include an ON state, an OFF state, and a fuel cutoff (FCO) state. When the engine operates in the OFF state, it is unfueled, not firing, and is not spinning. When the engine operates in the ON state it is fueled, firing, and spinning When the engine operates in the FCO state, it is spinning but is unfueled and not firing. The engine ON state may further include an all-cylinder state (ALL) wherein all cylinders are fueled and firing, and a cylinder-deactivation state (DEAC) wherein a portion of the cylinders are fueled and firing and the remaining cylinders are unfueled and not firing. The transmission ranges include a plurality of neutral (neutral), fixed gear (Gear #), variable mode (EVT Mode #), electric vehicle (EV#) and transitional (EV Transitional State# and Pseudo-gear #) ranges that are achieved by selectively activating the clutches C1 50, C2 52, C3 54, C4 56, and C5 58. A pseudo-gear range is a variable mode transmission range in which torque output from the transmission 10 corresponds to the input torque from the engine 12, taking into account torque losses associated with torque-consuming components on the input member 14. The pseudo-gear ranges are primarily employed as intermediate transmission ranges during shifts between EVT Mode ranges. Table 1 depicts a plurality of transmission ranges and engine states for operating the powertrain 100.

TABLE 1

| Range | Engine State | C1 | C2 | C3 | C4 | C5 |
|---|---|---|---|---|---|---|
| Neutral 1 | ON(ALL/DEAC/FCO)/OFF | | | | | |
| Neutral 2 | ON(ALL/DEAC/FCO)/OFF | | | x | | |
| Neutral 3 | ON(ALL/DEAC/FCO)/OFF | | | | x | |
| PseudoGear 1 | ON(ALL/DEAC/FCO)/OFF | x | | | | |
| PseudoGear 2 | ON(ALL/DEAC/FCO)/OFF | | x | | | |
| Neutral | OFF | | | | | x |
| EVT Mode 1 | ON(ALL/DEAC/FCO)/OFF | x | | x | | |
| EVT Mode 2 | ON(ALL/DEAC/FCO)/OFF | x | | | x | |
| EVT Mode 3 | ON(ALL/DEAC/FCO)/OFF | | | x | x | |
| EVT Mode 4 | ON(ALL/DEAC/FCO)/OFF | | | x | x | |
| EV Transitional State 1 | OFF | x | | | | x |
| EV Transitional State 2 | OFF | | | x | | x |
| Gear 1 | ON(ALL/DEAC/FCO) | x | | x | x | |
| Gear 2 | ON(ALL/DEAC/FCO) | x | x | | x | |
| Gear 3 | ON(ALL/DEAC/FCO) | | x | x | x | |
| EV1 | OFF | x | | x | | x |
| EV2 | OFF | x | | | x | x |

TABLE 1-continued

| Range | Engine State | C1 | C2 | C3 | C4 | C5 |
|---|---|---|---|---|---|---|
| EV3 | OFF | | x | | x | x |
| EV4 | OFF | | x | x | | x |
| EV Transitional State 3 | OFF | x | x | | | x |
| Neutral | ON(ALL/DEAC/FCO)/OFF | | | x | x | |
| PseudoGear 3 | ON(ALL/DEAC/FCO)/OFF | x | x | | | |
| Neutral | OFF | | | x | | x |
| Neutral | OFF | | | | x | x |

A method for operating the powertrain system described with reference to FIG. 1 to transfer torque among the engine, torque machines, and the driveline includes executing a search of a predetermined speed/torque search window to determine a preferred engine operating point for operating the powertrain system in one of the transmission ranges in response to an output torque request. The search identifies and compensates for factors that affect engine power output, including factors that derate engine power, such as elevation and fuel energy, and determines a preferred engine operating point for operating the powertrain system in a transmission range in response to an output torque request that compensates for the factors that affect engine power output including those factors that derate the engine power.

Figure 2:
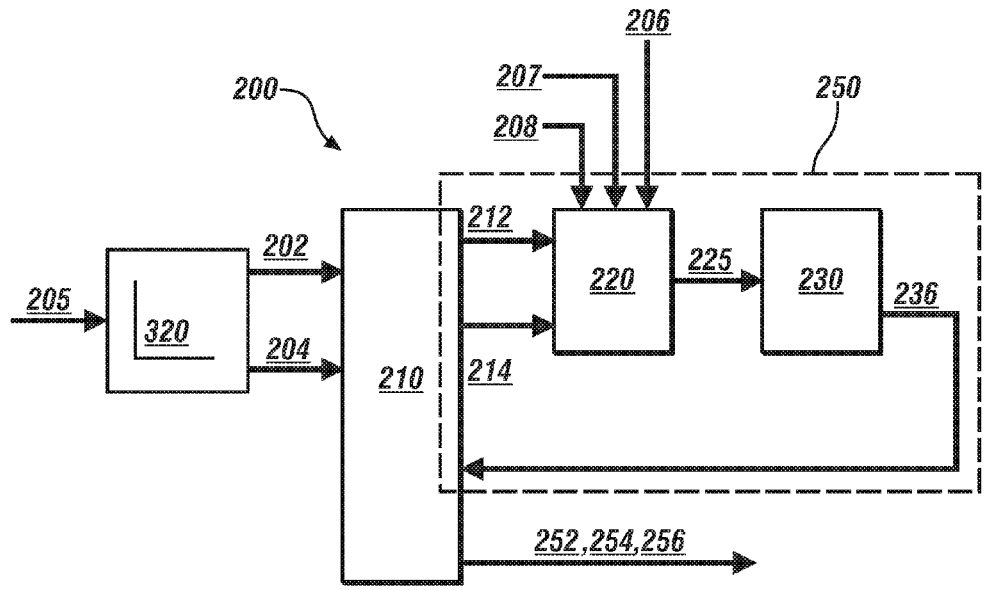
FIG. 2 illustrates a search scheme that employs a speed/torque search window to converge to a preferred engine speed and a preferred engine load, in accordance with the disclosure.

FIG. 2 schematically shows a search scheme 200 that employs a search engine 210 for determining a preferred engine speed Ne* 252 and a preferred engine torque output Te* 254 within a predetermined speed/torque search window 320 when operating the powertrain system 100 in response to an output torque request 206 with the transmission 10 in a selected range 207. The search scheme 200 also generates a power cost P* 256 associated with the preferred engine speed Ne* 252 and the preferred engine torque output Te* 254. The predetermined speed/torque search window 320 is selected based upon one or a plurality of monitored parameters 205 that can indicate that engine power is derated. A parameter that can indicate that engine power is derated includes barometric pressure, which indicates vehicle elevation. Another suitable parameter that can be used to indicate vehicle elevation and thus derated engine power includes input from a vehicle GPS system. A parameter that can indicate that engine power is derated includes spark ignition timing compensation to reduce pre-ignition, which indicates low octane fuel or low energy fuel. Other suitable parameters may be employed that indicate that engine power is derated.

Figure 3:
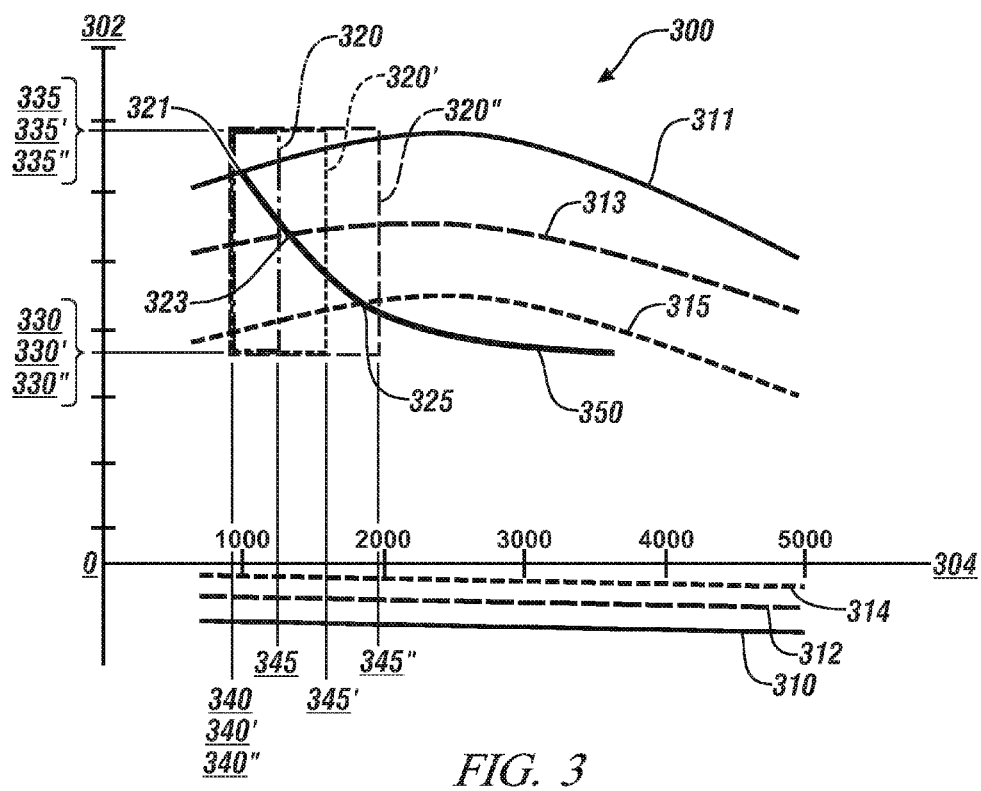
FIG. 3 illustrates a plurality of speed/torque search windows in relation to engine power output associated with operating an embodiment of the multi-mode powertrain system in response to an output torque request, in accordance with the disclosure.

FIG. 3 graphically shows engine output power 300 for an exemplary engine operating in an all-cylinder state in a steady-state condition, with engine torque shown on the vertical axis 302 in relation to engine speed on the horizontal axis 304. A plurality of speed/torque search windows 320, 320', and 320", respectively, are shown in relation to the engine output power. The engine output power is shown as a plurality of minimum and maximum engine torques in relation to engine speed. The depicted data is illustrative of power output of an engine but does not reflect a specific embodiment of an engine. Minimum and maximum torque lines 310 and 311 show engine torque capability in relation to engine speed for an engine that is operating in an all-cylinder state in a steady-state condition at sea level in a warmed-up condition with known good fuel at MBT-spark. The minimum and maximum torque lines 310 and 311 depict the minimum and maximum torque capability of the engine, respectively. Minimum and maximum torque lines 312 and 313, respectively, show engine torque capability in relation to engine speed for the same engine that is operating in a steady-state condition in the all-cylinder state at a first derated condition. The first derated condition can include the engine operating at an elevation greater than sea level, e.g., at an elevation of 1000 meters in a warmed-up condition with known good fuel at MBT-spark. The first derated condition may instead include the engine operating at sea level in a cold operating state, or with poor fuel causing the engine to operate away from MBT-spark, or other conditions that limit torque capability of the engine. Minimum and maximum torque lines 314 and 315, respectively, show engine torque capability in relation to engine speed for the same engine that is operating in the all-cylinder state at a steady-state condition at a second derated condition. The second derated condition can include the engine operating at an elevation greater than sea level, e.g., at an elevation of 2000 meters in the all-cylinder state in a warmed-up condition with known good fuel at MBT-spark. The second derated condition may instead include the engine operating at sea level in a cold operating state, or with poor fuel causing the engine to operate away from MBT-spark, or other conditions that limit torque capability of the engine.

Line 350 represents a line of constant engine power. Engine power is determined in relation to engine speed and torque with the power being determined as follows: Power=Speed*Torque*constant. Engine operating points 321, 323, and 325 are shown on the constant engine power line 350, with each generating the same magnitude of engine power. The first speed/load operating point 321 represents engine power achieved at maximum torque 311, i.e., at the maximum torque capability for the engine at a selected engine speed. The second speed/load operating point 323 represents the engine power achieved when the engine is operating at maximum torque 313 under the first derated condition. The third speed/load operating point 325 represents the engine power achieved when the engine is operating at maximum torque 315 under the second derated condition. Thus, as the engine power is derated, engine speed must increase to achieve the same engine power. This characteristic is employed to manage engine operation to achieve an engine power level that is responsive to the overall powertrain operation.

Exemplary first, second, and third speed/torque search windows 320, 320', and 320", respectively, are depicted, with minimum and maximum torque limits and minimum and maximum speed limits. The first, second, and third speed/torque search windows 320, 320', and 320" have corresponding minimum engine torque limits 330, 330', and 330", and corresponding maximum engine torque limits 335, 335', and 335", respectively. The maximum engine torque limits 335, 335', and 335" are circumscribed by the corresponding maximum torque 311, 321, and 331, respectively. As shown, the minimum engine torque limits 330, 330', and 330" are the same magnitude. The maximum engine torque limits 335, 335', and 335" appear as the same magnitude for purposes of the search window, but are circumscribed by the corresponding maximum torque 311, 321, and 331. The first, second, and third speed/torque search windows 320, 320', and 320" have corresponding minimum engine speed limits 340, 340', and 340", and corresponding maximum engine speed limits 345, 345', and 345", respectively. As shown, the minimum engine speed limits 340, 340', and 340" are the same magnitude, although the system is not so limited. The maximum engine speed limits 345, 345', and 345" increase in magnitude with increase in derating of the engine. The speed/torque search windows circumscribe the search areas, but cannot violate actual speed/torque capability of the engine. Thus, the result of the search execution will not command operation of the engine at a speed/torque operating point at which the engine is incapable of operating.

The first search window 320 includes a range of engine torques circumscribed by a maximum achievable torque and a first range of engine speeds, e.g., from 900 RPM to 1300 RPM. The first search window 320 includes the first speed/load operating point 321, but fails to include the second and third speed/load operating points 323 and 325. The second search window 320' includes a range of engine torques circumscribed by a maximum achievable torque and a second range of engine speeds, e.g., from 900 RPM to 1600 RPM. The second search window 320' includes the first and second speed/load operating points 321 and 323, but fails to include the third speed/load operating point 325. The third search window 320" includes a range of engine torques circumscribed by a maximum achievable torque and a second range of engine speeds, e.g., from 900 RPM to 2000 RPM. The third search window 320" includes the first, second, and third speed/load operating points 321, 323, and 325. An analogous set of search windows are developed and employed for engine output power for the exemplary engine operating in the cylinder-deactivation state in a steady-state condition. The search scheme can be executed to determine a preferred engine operating point and a corresponding preferred transmission state for operating the engine in the cylinder-deactivation state under full engine power and when the engine is operating in a derated power condition.

Referring again to FIG. 2, the search scheme 200 employs a selected one of the search windows 320, 320', 320" to determine a speed range 202 and a torque range 204, which are input to the two-dimensional search engine (search engine) 210. The search engine 210 iteratively generates a plurality of candidate engine speeds Ne(j) 212 across the input speed range 202 and a plurality of candidate engine torques T(j) 214, each which is input to an iteration loop 250. The iteration loop 250 employs a system torque optimization scheme 220, and a power cost model 230 to calculate a candidate power cost Pcost(j) 236 for each candidate engine speed Ne(j) 212 and each candidate engine torque T(j) 214. The search engine 210 monitors the candidate power costs Pcost(j) 236 for all iterations. The candidate engine speed Ne(j) 212 and candidate engine torque Te(j) 214 that achieves a minimum of the candidate power costs Pcost(j) 236 is selected by the search engine 210 as the preferred engine speed Ne* 252 and preferred engine torque Te* 254. The preferred engine speed Ne* 252, preferred engine torque Te* 254, and corresponding power cost P* 256 are identified based upon execution of a plurality of iteration loops across the input speed range 202 and input torque range 204. In one embodiment the iteration loops across the input speed range 202 includes dividing the input speed range 202 into five discrete engine speeds between the minimum engine speed limit 340 and the maximum engine speed limit 345 for the predetermined speed/torque search window 320, and dividing the input torque range 204 into five discrete engine torques between the minimum engine torque limit 330 and the maximum engine torque limit 335, with the search scheme 200 executing at each of the discrete loads for each of the discrete speeds to identify the preferred engine speed Ne* 252 and the preferred engine torque Te* 254. Thus, it is appreciated that the search window that has a broader input speed range, e.g., between minimum engine speed limit 340 and corresponding maximum engine speed limit 345", has less resolution and thus less search precision than a search window that has a narrower input speed range, e.g., between minimum engine speed limit 340 and corresponding maximum engine speed limit 345.

The system torque optimization scheme 220 employs the candidate engine speed Ne(j) 212, the candidate engine torque T(j) 214, an output torque request 206, an output speed of the transmission, transmission range 207, and powertrain system operating parameters 208 to determine an optimized candidate powertrain operating point 225 for operating in one of the transmission ranges. The transmission range 207 is a selected one of the transmission ranges set forth in Table 1 for one embodiment of the powertrain system 100. The powertrain system operating parameters 208 include operating limits for the first and second torque machines 60, 62, e.g., minimum and maximum torques and minimum and maximum speeds, and operating limits for the battery 85, e.g., battery power limits including maximum discharge limits, maximum charge limits, and a present state of charge. The optimized candidate powertrain operating point 225 includes preferred operating parameters for the first and second torque machines 60, 62, e.g., torque and speed, and preferred operating parameters for the battery 85, e.g., battery power, in response to the output torque request 206 when the engine is operating at the candidate engine speed Ne(j) 212 and the candidate engine torque T(j) 214 and the transmission is operating in the selected transmission range 207. The power cost model 230 employs a power cost function to determine a candidate power cost P(j) 236 for operating the powertrain at the optimized candidate powertrain operating point 225. An exemplary power cost model 230 is described with reference to FIG. 4.

The search engine 210 selects the preferred engine speed Ne* 252 and preferred engine torque Te* 254 based upon the power costs for all the candidate engine speeds Ne(j) 212 and candidate engine torques T(j) 214. The preferred engine speed Ne* 252 and preferred engine torque Te* 254 are the candidate engine speed Ne(j) 212 and the candidate engine torque T(j) 214 that result in a minimum total power cost for operating the powertrain system 100 in the selected transmission range 207 in response to the output torque request 206 within the search window 320, which is limited to the speed and torque capability of the engine subject to those factors that derate the engine power. The preferred engine speed Ne* 252 and preferred engine torque Te* 254 can be employed to control operation of the engine 12 in the selected transmission range 207, with operation of the powertrain system 100 corresponding thereto.

Figure 4:
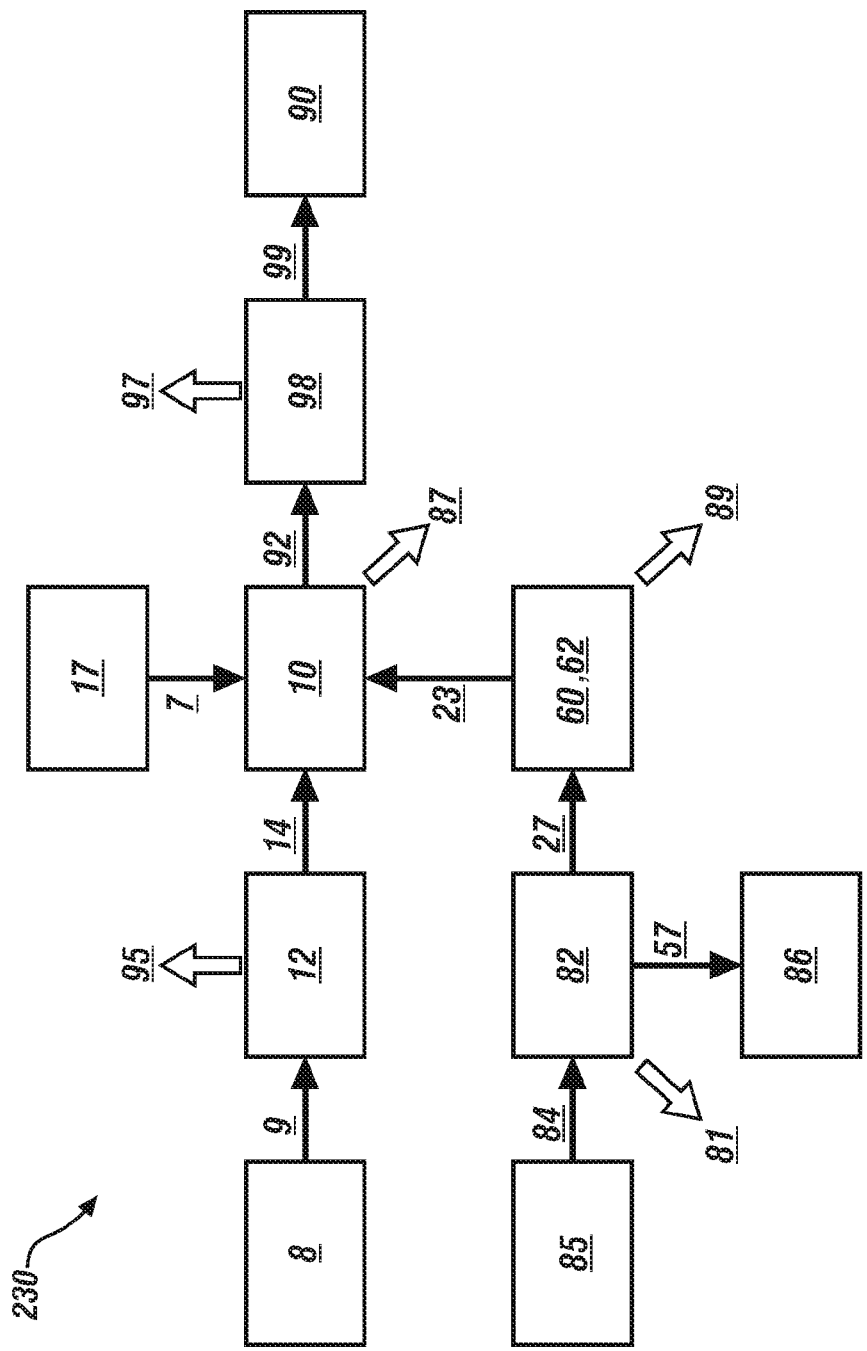
FIG. 4 illustrates an exemplary power cost model including an analytic framework for determining powertrain system operating costs, in accordance with the disclosure.

FIG. 4 schematically illustrates an exemplary power cost model 230 including an analytic framework for determining powertrain system operating costs, which is described with reference to the multi-mode powertrain system 100 described with reference to FIG. 1. Powertrain elements include engine 12, transmission 10, non-combustion torque machines 60, 62, battery 85, inverter 82, wheel brakes 98, driveline 90, and a fuel storage system 8. Pseudo-elements include an inertial load 17, which is an element constructed to account for system inertias, and high-voltage electrical load 86, which is an element constructed to account for high-voltage loads in the vehicle outside that load used for propulsion of the powertrain system 100. Power flow paths include a first power flow path 9 from the fuel storage system 8 to transfer fuel power to the engine 12, a second power flow path 14 between the engine 12 and the transmission 10, and third power flow path 84 between the battery 85 and the inverter 82, a fourth power flow path 83 between the inverter 82 and the high-voltage electrical load 86, and fifth power flow path 27 between the inverter 82 and the non-combustion torque machines 60, 62, a sixth power flow path 23 between the non-combustion torque machines 60, 62 and the transmission 10, and seventh power flow path 7 between the inertial load 17 and the transmission 20, an eighth power flow path 92 between the transmission 10 and the wheel brakes 98, and a ninth power flow path 99 between the wheel brakes 98 and the driveline 90. Power losses include engine power losses 95, battery power losses 81, mechanical power losses 87, electric motor losses 89, and brake power losses 97. The power cost inputs to the power cost model 230 are determined based upon factors related to vehicle drivability, fuel economy, emissions, and battery usage. Power costs are assigned and associated with fuel and electrical power consumption and are associated with a specific operating points of the multi-mode powertrain. Lower operating costs can be associated with lower fuel consumption at high conversion efficiencies, lower battery power usage, and lower emissions for each engine speed/load operating point, and take into account the candidate operating state of the engine 14. The power costs may include the engine power losses 95, electric motor power losses 89, battery power losses 81, brake power losses 97, and mechanical power losses 87 associated with operating the multi-mode powertrain at specific operating points for the engine 12 and the non-combustion torque machines 60, 62. The power cost model 230 may be employed to determine a total power cost for operating at a selected engine operating point and selected engine state while operating the powertrain system responsive to an output torque request.

Figure 5:
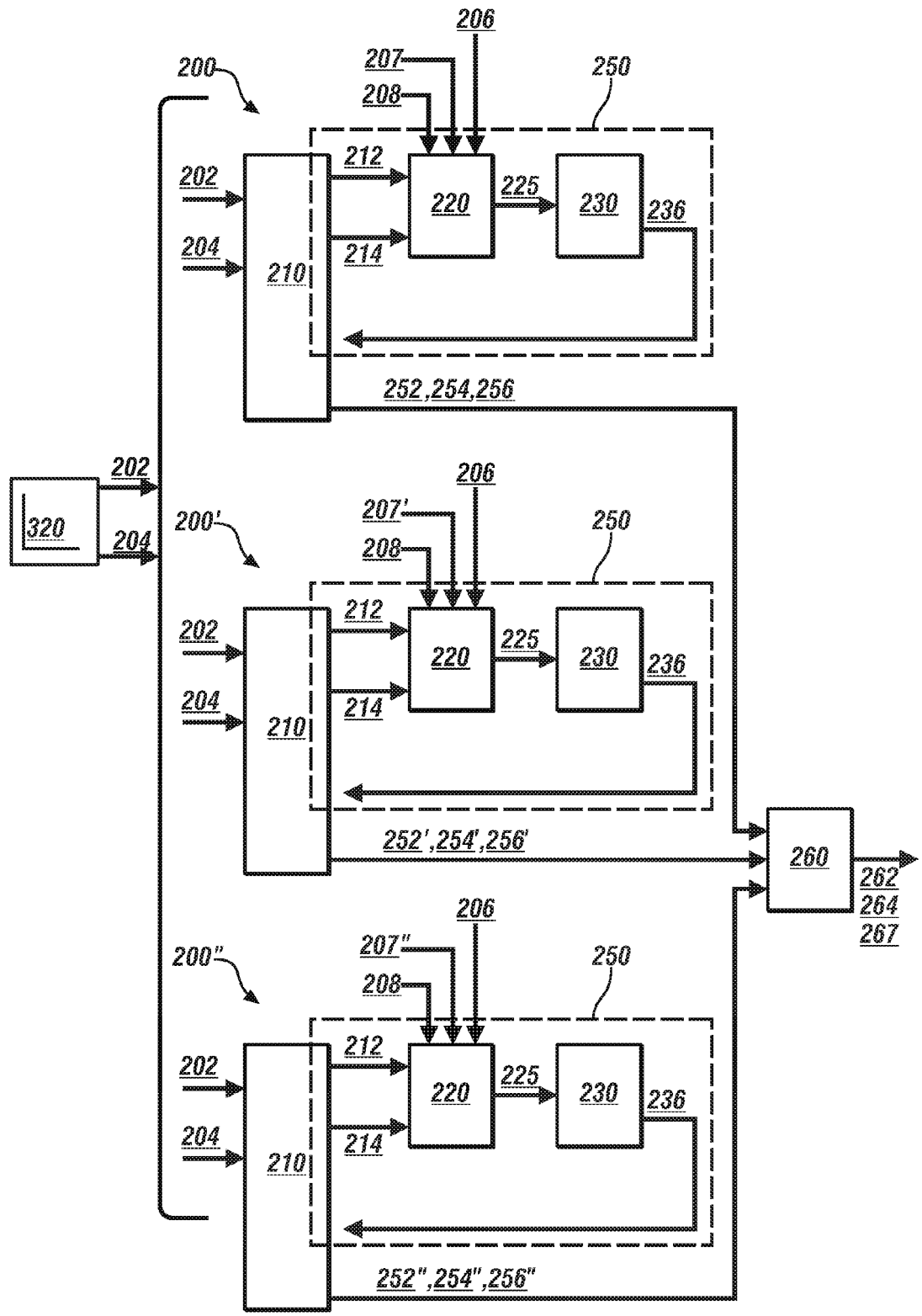
FIG. 5 illustrates a plurality of search schemes that are configured to determine preferred engine speeds and torque outputs, and corresponding power costs in response to a speed/torque search window when operating a powertrain system in response to an output torque request with the transmission operating in different candidate transmission ranges, in accordance with the disclosure.

FIG. 5 schematically shows a plurality of search schemes 200, 200', and 200" that are configured to determine preferred engine speeds Ne* 252, preferred engine torque outputs Te* 254, and corresponding power costs P* 256 in response to a predetermined speed/torque search window 320 when operating the powertrain system 100 in response to the output torque request 206 with the transmission 10 in different candidate transmission ranges, including candidate transmission ranges 207, 207', and 207" as shown. A selection/arbitration scheme 260 selects one of the candidate transmission ranges 207, 207', and 207" as a preferred transmission range, and controls operation of the powertrain system 100 in response.

Each of the search schemes 200, 200', and 200" is analogous to the search scheme 200 described with reference to FIG. 2. The predetermined speed/torque search window 320 is determined as previously described. Each of the search schemes 200, 200', and 200" employs the search engine 210 to search within the predetermined speed/torque search window 320 while operating the powertrain system 100 in response to the output torque request 206 with the transmission 10 in the candidate transmission ranges 207, 207', and 207", respectively. The search scheme 200 determines preferred engine speed Ne* 252, preferred engine torque output Te* 254, and corresponding power cost P* 256 when operating the powertrain system 100 in response to the output torque request 206 with the transmission 10 in the first candidate transmission range 207. The search scheme 200' determines preferred engine speed Ne* 252', preferred engine torque output Te* 254', and corresponding power cost P* 256' when operating the powertrain system 100 in response to the output torque request 206 with the transmission 10 in the second candidate transmission range 207'. The search scheme 200" determines preferred engine speed Ne* 252", preferred engine torque output Te* 254", and corresponding power cost P* 256" when operating the powertrain system 100 in response to the output torque request 206 with the transmission 10 in the third candidate transmission range 207". It is appreciated that there may be additional searches associated with other candidate transmission ranges.

The aforementioned speeds 252, torques 254 and power costs 256 associated with the plurality of candidate transmission ranges 207, 207', and 207" are input to the selection/arbitration block 260, which acts to select one of the candidate transmission ranges 207, 207', and 207" as a preferred transmission range 267 for controlling the transmission 10 with the corresponding speed 252 and torque 254 employed as the preferred speed 262 and torque 264 for controlling operation of the engine 12. The selection/arbitration block 260 employs hysteresis and other tactics to minimize shift busyness.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a powertrain system including a multi-mode transmission configured to transfer torque among an engine, torque machines, and a driveline, the method comprising:
  identifying a speed/torque search window responsive to a parameter indicating derated engine power output;
  executing a search, by a controller, to determine a preferred engine operating point for operating the powertrain system in response to an output torque request, said search comprising:
    for each of a plurality of candidate engine speeds and candidate engine torques within said speed/torque search window, determining a candidate power cost associated with operating the powertrain system at the candidate engine torque and candidate engine speed, and
    determining a preferred engine operating point comprising the candidate engine speed and the candidate engine torque associated with a minimum of the candidate power costs; and
  controlling engine operation responsive to the preferred engine operating point when the engine power output is derated.

2. The method of claim 1, wherein identifying a speed/torque search window responsive to a parameter indicating derated engine power output comprises identifying a speed/torque search window responsive to barometric pressure.

3. The method of claim 2, wherein identifying a speed/torque search window responsive to barometric pressure comprises expanding a maximum engine speed search limit in response to a decrease in barometric pressure.

4. The method of claim 1, wherein identifying a speed/torque search window responsive to a parameter indicating derated engine power output comprises identifying a speed/torque search window responsive to spark ignition timing compensation to reduce pre-ignition.

5. A method for operating a powertrain system including a multi-mode transmission configured to transfer torque among an engine, torque machines, and a driveline, the method comprising:
  for each of a plurality of candidate transmission ranges:
    identifying a speed/torque search window responsive to a parameter indicating derated engine power output;
    executing a search, by a controller, to determine a preferred engine operating point for operating the powertrain system in the candidate transmission range in response to an output torque request, said search comprising:

for each of a plurality of candidate engine speeds and candidate engine torques within said speed/torque search window, determining a candidate power cost associated with operating the powertrain system in the candidate transmission range at the candidate engine torque and engine speed, and determining a preferred engine operating point comprising the candidate engine speed and the candidate engine torque associated with a minimum of the candidate power costs for the candidate transmission range;

selecting a preferred transmission range comprising the one of the plurality of candidate transmission ranges corresponding to a minimum of the minimum candidate power costs for the candidate transmission ranges; and controlling the transmission to the preferred transmission range and controlling the engine to the associated preferred engine operating point when the engine power output is derated.

6. The method of claim 5, wherein identifying a speed/torque search window responsive to a parameter indicating derated engine power output comprises identifying a speed/torque search window responsive to barometric pressure.

7. The method of claim 6, wherein identifying a speed/torque search window responsive to barometric pressure comprises expanding a maximum engine speed search limit in response to a decrease in barometric pressure.

8. The method of claim 5, wherein identifying a speed/torque search window responsive to a parameter indicating derated engine power output comprises identifying a speed/torque search window responsive to spark ignition timing compensation to reduce pre-ignition.

9. A method for operating a powertrain system including a multi-mode transmission configured to transfer torque among an engine, torque machines, and a driveline, the method comprising:

monitoring a parameter indicating derated engine power output;

monitoring an output torque request;

identifying a speed/torque search window responsive to the parameter indicating derated engine power output;

executing a search, by a controller, to determine a preferred engine operating point for operating the powertrain system in a transmission range in response to the output torque request, said search comprising:

determining a candidate power cost associated with operating the powertrain system for each of a plurality of candidate engine operating points within the speed/torque search window, and determining a preferred engine operating point comprising the candidate engine operating point associated with a minimum of the candidate power costs; and controlling the transmission in the transmission range and controlling engine operation responsive to the preferred engine operating point when the engine power output is derated.

10. The method of claim 9, wherein identifying a speed/torque search window responsive to a parameter indicating derated engine power output comprises identifying a speed/torque search window responsive to barometric pressure.

11. The method of claim 10, wherein identifying a speed/torque search window responsive to barometric pressure comprises expanding a maximum engine speed search limit in response to a decrease in barometric pressure.

12. The method of claim 9, wherein identifying a speed/torque search window responsive to a parameter indicating derated engine power output comprises identifying a speed/torque search window responsive to spark ignition timing compensation to reduce pre-ignition.

13. The method of claim 9, wherein executing the search to determine a preferred engine operating point comprises executing the search to determine the preferred engine operating point for operating the engine in an all-cylinder state.

14. The method of claim 9, wherein executing the search to determine a preferred engine operating point comprises executing the search to determine the preferred engine operating point for operating the engine in a cylinder-deactivation state.

\* \* \* \* \*